United States Patent
Seibert, Jr. et al.

(10) Patent No.: US 11,025,624 B2
(45) Date of Patent: *Jun. 1, 2021

(54) INTER-APPLICATION DELEGATED AUTHENTICATION

(71) Applicant: Twitter, Inc., San Francisco, CA (US)

(72) Inventors: Jeffrey Seibert, Jr., San Francisco, CA (US); Michael Ducker, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/735,605

(22) Filed: Jan. 6, 2020

(65) Prior Publication Data

US 2020/0153829 A1   May 14, 2020

Related U.S. Application Data

(63) Continuation of application No. 15/889,073, filed on Feb. 5, 2018, now Pat. No. 10,530,774, which is a
(Continued)

(51) Int. Cl.
*H04L 29/06*        (2006.01)
*G06F 21/44*        (2013.01)
(Continued)

(52) U.S. Cl.
CPC .......... *H04L 63/0884* (2013.01); *G06F 21/44* (2013.01); *H04L 9/0819* (2013.01);
(Continued)

(58) Field of Classification Search
CPC ........................... H04L 63/0815; G06F 21/44
See application file for complete search history.

(56) References Cited

U.S. PATENT DOCUMENTS 7,457,948 B1    11/2008   Bilicksa et al.
7,877,792 B2     1/2011   Barnabo et al.
(Continued)

FOREIGN PATENT DOCUMENTS

CN         103477602        12/2013
EP           3138011         3/2017
(Continued)

OTHER PUBLICATIONS

Chinese Office Action issued in Chinese Application No. 201580033649.6 (with English translation), dated Aug. 31, 2018, 17 pages.

(Continued)

*Primary Examiner* — William S Powers
(74) *Attorney, Agent, or Firm* — Fish & Richardson P.C.

(57) ABSTRACT

Disclosed is a system for delegating authentication of an untrusted application executing on a client device. For delegated authentication, an untrusted application relies on a trusted application executing in the same environment for authentication purposes. The delegated authentication process avoids requiring the user of the untrusted application to provide authentication credentials. The disclosed system for delegating authentication enables any trusted application executing in the same computing environment to authenticate the untrusted application.

30 Claims, 4 Drawing Sheets

Related U.S. Application Data continuation of application No. 15/483,989, filed on Apr. 10, 2017, now Pat. No. 9,888,000, which is a continuation of application No. 14/699,888, filed on Apr. 29, 2015, now Pat. No. 9,654,461.

(60) Provisional application No. 62/067,309, filed on Oct. 22, 2014, provisional application No. 61/986,815, filed on Apr. 30, 2014, provisional application No. 61/986,094, filed on Apr. 29, 2014.

(51) Int. Cl.
  *H04L 9/08* (2006.01)
  *H04L 9/32* (2006.01)
  *H04W 12/43* (2021.01)

(52) U.S. Cl.
  CPC ........ *H04L 9/3236* (2013.01); *H04L 63/0807* (2013.01); *H04L 63/0815* (2013.01); *H04L 63/102* (2013.01); *H04W 12/43* (2021.01)

(56) References Cited

U.S. PATENT DOCUMENTS

| | | | |
|---|---|---|---|
| 8,185,938 B2 | 5/2012 | Benantar | |
| 8,613,070 B1* | 12/2013 | Borzycki | H04L 67/10 726/8 |
| 8,615,794 B1 | 12/2013 | Tomilson et al. | |
| 9,183,361 B2* | 11/2015 | Obasanjo | G06F 21/31 |
| 9,654,461 B2 | 5/2017 | Seibert et al. | |
| 9,888,000 B2 | 2/2018 | Seibert et al. | |
| 2002/0150253 A1 | 10/2002 | Brezak et al. | |
| 2006/0291483 A1 | 12/2006 | Sela | |
| 2008/0046983 A1 | 2/2008 | Lester et al. | |
| 2010/0093310 A1 | 4/2010 | Gbadegesin et al. | |
| 2010/0125894 A1 | 5/2010 | Yasrebi et al. | |
| 2010/0306829 A1 | 12/2010 | Nishio | |
| 2011/0202988 A1* | 8/2011 | Otranen | H04L 9/3213 726/8 |
| 2012/0102326 A1 | 4/2012 | Palekar | |
| 2012/0227095 A1* | 9/2012 | Wood | H04L 63/08 726/5 |
| 2012/0266229 A1* | 10/2012 | Simone | H04L 63/08 726/9 |
| 2013/0340048 A1 | 12/2013 | Sebastian et al. | |
| 2014/0013396 A1 | 1/2014 | Field-Eliot et al. | |
| 2014/0108486 A1 | 4/2014 | Borzycki et al. | |
| 2015/0180850 A1 | 6/2015 | Venkataramana et al. | |
| 2015/0242609 A1* | 8/2015 | Zheng | G06F 21/35 713/159 |

FOREIGN PATENT DOCUMENTS

| | | |
|---|---|---|
| WO | WO2006085169 | 8/2006 |
| WO | WO2012140477 | 10/2012 |

OTHER PUBLICATIONS

Chinese Office Action issued in Chinese Application No. 201580033649.6 (with English translation), dated Jul. 2, 2019, 25 pages.
European Extended Search Report, European Application No. 15786725.0, dated Sep. 19, 2017, 10 pages.
European Patent Office Action issued in European Patent Office Application No. 15786725.0-1218, dated Oct. 7, 2019, 8 pages.
International Preliminary Report on Patentability in International Application No. PCT/US2015/028319, dated Nov. 1, 2016, 6 pages.
PCT International Search Report and Written Opinion, PCT Application No. PCT/US15/28319, dated Aug. 5, 2015, 13 pages.
United States Office Action, U.S. Appl. No. 14/699,888, dated Jul. 14, 2016, 16 pages.

* cited by examiner

INTER-APPLICATION DELEGATED AUTHENTICATION

CROSS REFERENCE TO RELATED APPLICATIONS

This application is a continuation of U.S. patent application Ser. No. 15/889,073, now U.S. Pat. No. 10,530,774, for "INTER-APPLICATION DELEGATED AUTHENTICATION," filed on Feb. 5, 2018, which is a continuation of U.S. patent application Ser. No. 15/483,989, now U.S. Pat. No. 9,888,000, for "INTER-APPLICATION DELEGATED AUTHENTICATION," filed on Apr. 10, 2017, which is a continuation of U.S. patent application Ser. No. 14/699,888, now U.S. Pat. No. 9,654,461, for "INTER-APPLICATION DELEGATED AUTHENTICATION," which application claims a benefit of, and priority to, U.S. Patent Application No. 61/986,094, entitled "Authentication Mechanism" and filed on Apr. 29, 2014, U.S. Patent Application No. 61/986,815, entitled "SDK Platform" and filed on Apr. 30, 2014, and U.S. Patent Application No. 62/067,309, entitled "Authentication Mechanism" and filed on Oct. 22, 2014. The contents of U.S. Patent Application No. 61/986,094, U.S. Patent Application No. 61/986,815, and U.S. Patent Application No. 62/067,309 are all incorporated by reference herein in their entirety. This application is related to U.S. application Ser. No. 14/698,819, entitled "Authentication Mechanism," now U.S. Pat. No. 9,699,161.

BACKGROUND

The disclosure generally relates to the field of application authentication on computing devices.

An application executing on a device engages in an authentication process where credentials are exchanged between the authenticating entity and the application in order to authorize the application to take certain actions. A problem with a typical authentication process is requiring a user of the device to manually provide the credentials to proceed with the authentication. This is both cumbersome and inefficient for the user and requires the user to maintain credentials for each application executing on the device. A solution to this problem enables a particular application on the device to act as an authentication gatekeeper such that other applications may rely on the gatekeeping application for authentication purposes. This solution, however, requires the user of the device to install and maintain that gatekeeping application on the device. In some scenarios, installing the gatekeeping application is not a desirable solution for the user.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
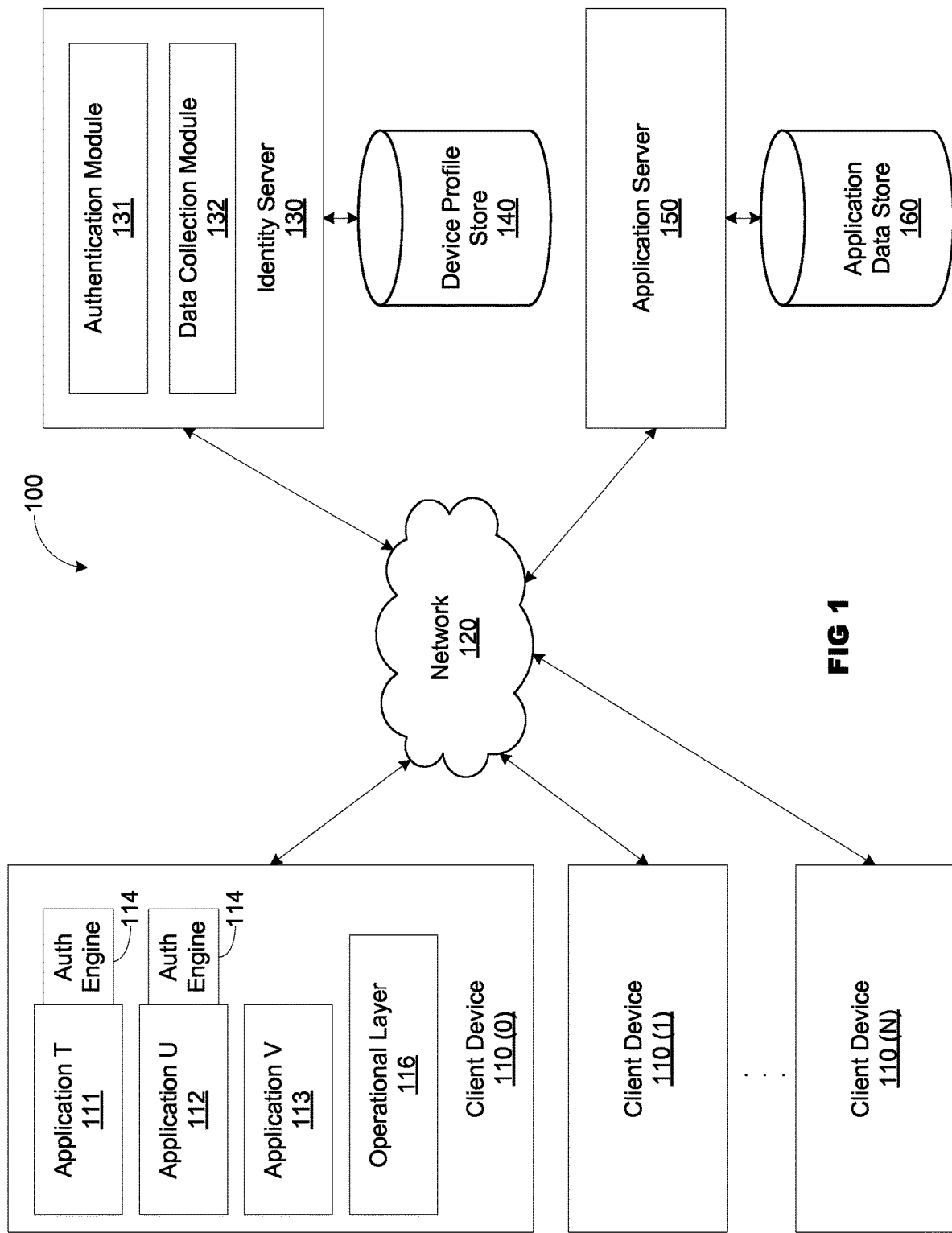
FIG. 1 illustrates an example computing environment.

The Figures (FIGS.) and the following description relate to embodiments by way of illustration only. It should be noted that from the following discussion, alternative embodiments of the structures and methods disclosed herein will be readily recognized as viable alternatives that may be employed without departing from the principles of what is claimed.

Configuration Overview

Disclosed by way of example embodiments is a mechanism for delegating the authentication of an untrusted application executing on a client device. By way of example, an untrusted application can be an application that has not been authenticated with one or more credentials associated with the client device. The mechanism for delegating authentication can be embodied as a system, method and/or a computer program product (e.g., a computer readable storage medium that stores instructions executable by one or more processing units). For delegated authentication, an untrusted application on a client device relies on a previously authenticated application, a trusted application, in the same environment for authentication purposes. By way of example, an environment can be a computing device, such as a mobile device, or a collection of a device, such as a mobile device and an Internet of Things (IoT) device. The delegated authentication process avoids requiring the user of the untrusted application to provide authentication credentials or the operating system of the client device to maintain a list of trusted applications and associated authentication credentials. Unlike the gatekeeping application, the delegating authentication mechanism enables any trusted application, and not only the gatekeeping application, to authenticate to authenticate the untrusted application.

In operation, an untrusted application executing on a client device requests to be authenticated by an identity server with credentials associated with the client device. Until an untrusted application is authenticated, the identity server cannot confirm that the application can be legitimately authenticated with the credentials associated with the client device. To initiate authentication, the untrusted application transmits an authentication request in conjunction with a unique parameter of the client device on which the application is executing. The unique parameter is correlated with the credentials associated with the client device. The unique parameter may be an identifier of the client device, such as a phone number or a media access control (MAC) address, or a representation of one or more attributes of the client device, such as screen size, screen resolution, volume settings, a list of applications executing on the client device, or carrier information.

Based on the unique parameter, the identity server accesses, from a data store, a device profile of the client device that includes, among other information, a list of trusted applications that also execute on the client device. The identity server trusts communications received from trusted applications because the communications are encrypted: this trust relationship between the identity server and the trusted applications is the foundation of the delegated authentication process disclosed herein.

Specifically, the identity server selects one of these trusted applications based on the relative level of activity determined for the trusted applications. Once a trusted application is selected, the identity server indicates to the untrusted application to continue the authentication process via the selected trusted application. The selected trusted application subsequently co-ordinates the authentication of the untrusted application with the identity server. Since the trusted application has been previously authenticated, the identity server trusts authentication requests received from the trusted application on behalf of the untrusted application. The identity server thereby authenticates the untrusted application with the credentials associated with the client device.

The following discussion describes in further detail the configuration and operation of the identity server, the trusted application, and the untrusted application when authenticating the untrusted application.

Example Computing Environment

FIG. 1 illustrates an example computing environment 100. As shown, the computing environment 100 includes client devices 110(0)-110(N) (collectively, client devices 110, and, individually, client device 110), a network 120, an identity server 130, a device profile store 140, an application server 150, and an application data store 160.

The network 120 may comprise any combination of local area and/or wide area networks, the Internet, or one or more intranets, using both wired and wireless communication systems. In one embodiment, each of the components included in the computing environment 100 communicate with one another over the network 120. In alternative embodiments, two or more of the components communicate through a dedicated or networked communication channel (not shown) other than the network 120.

The client device 110 is a computer comprised of a processor, a memory, a display, an input device, and a wired and/or wireless network device for communicating with external entities. Examples of a client device 110 may be a desktop computer, a laptop computer, a tablet computer, a smart phone, an internet of things (IoT) device, and any other device including computing functionality and data communication capabilities.

Each client device 110 includes an operating system or a kernel, such as operational layer 116. The operational layer 116 is a software component that manages the hardware and software resources of the client device 110. In an embodiment, the operational layer 116 also provides common services to other software applications executing on the client device 110. These services may include power management, network management, inter-application communication, etc.

The client devices 110 also include software applications, such as application T 111, application U 112, and application V 113, comprised of instructions that execute on the processor included in the respective client device 110. Each application executing on the client device 110 is associated with a unique application identifier and performs various functions. Examples of such applications may be a web browser, a social networking application, a messaging application, a gaming application, and a media consumption application. While each of the client devices 110 may include similar applications, reference will be made only to application T 111 and application U 112 executing on client device 110(0) for the remaining discussion.

Each application T 111 and U 112 integrates with different instances of the authentication engine 114. The authentication engine 114 provides a set of operations that enable applications to perform authentication related activities. In an embodiment, an entity that operates the identity server 130 provides the authentication engine 114 to the application developers of application T 111 and application U 112. In an alternative embodiment, the authentication engine 114 is provided as part of the common services offered by the operational layer 116.

The authentication engine 114 provides at least three operations that facilitate the delegated authentication process. First, the authentication engine 114 enables bi-directional communication between applications that integrate with the authentication engine 114 and the identity server 130. Second, the authentication engine 114 enables untrusted applications to launch and locally communicate with trusted applications, i.e., those applications that were previously authenticated by the identity server 130. Third, the authentication engine 114 enables applications that integrate with the authentication engine 114 to transmit events related to the applications to the identity server 130. An event indicates an action taken by a user of an application or any other action related to the application and a timestamp indicating when the action occurred. Examples of such actions include launching the application, actuating a feature of the application, manipulating the user interface of the application (e.g., by scrolling or swiping), and the application crashing.

The identity server 130 provides identity management and authentication services to applications executing on the client devices 110. The identity server 130 includes an authentication module 131 and a data collection module 132. The authentication module 131 receives and processes authentication requests from untrusted applications executing on the client devices 110. In general, the authentication module 131 facilitates the delegated authentication of an untrusted application by relying on a trusted application executing on the same device as the untrusted application. When an untrusted application is authenticated, the authentication module 131 generates an authentication token for the newly trusted application. The authentication token may be used by the application for subsequent secure communication with the identity server 130 or an application server 150.

For each of the trusted applications executing on client devices 110, the data collection module 132 receives, via the respective authentication engines 114, events indicating actions taken by users of the application or any other actions related to the application. An event may identify a type of the action, a timestamp indicating when the action occurred, any logs associated with the action (such as analytics or crash logs), and a geographic location associated with the event. The data collection module 132 processes the events received from the client devices 110 to generate a comprehensive device profile for each client device 110. The data collection module 132 stores the device profiles generated for client devices 110 in the device profile store 140.

A device profile for a client device 110 identifies one or more applications previously authenticated by the authentication module 131. Specifically, for a given client device 110, the device profile includes a unique identifier associated with the client device 110 and one or more application profiles associated with applications included in the client device 110. An application profile includes a unique identifier associated with the application, authentication tokens generated for the application, and a usage history of the application.

In general, the usage history of the application indicates a level of activity on the application. The usage history includes each of the events received from the application via the authentication engine 114. Optionally, the usage history also includes metrics derived from the received events. For example, the data collection module 132 may generate a frequency metric based on the frequency of events received from the application. In another example, the data collection module 132 may generate an engagement metric based on the types of actions taken by a user on the application and the frequency of those actions. Other types of metrics generated from events for the purpose of determining a level of activity on the application are within the scope here.

Optionally, the data collection module 132 collects additional information about various applications, including those executing on a client device 110, from third party sources. This additional information may include indications of the popularity of an application across various demographics and geographic regions. The additional information may also include information related to the application developer that developed the application.

When authenticating an untrusted application, the authentication module 131 selects a trusted application included on the same client device 110 to which the authentication of the untrusted application is delegable. The authentication module 131 selects the trusted application based on the device profile associated with the client device 110. If more than one trusted application is included on the client device 110, then the authentication module 131 selects one of the trusted applications based on the usage history of the application and any additional information collected by the data collection module 132. In one embodiment, the authentication module 131 selects a trusted application having a higher level of activity and/or more recent activity relative to other applications as that indicates a higher likelihood of the trusted application still being present on the client device 110 and thus available to continue the authentication process.

The discussion below further describes how application T 111, a trusted application, and application U 112, an untrusted application, operate in conjunction with the authentication module 131 to authenticate application U 112.

Delegated Authentication of Applications

Figure 2:
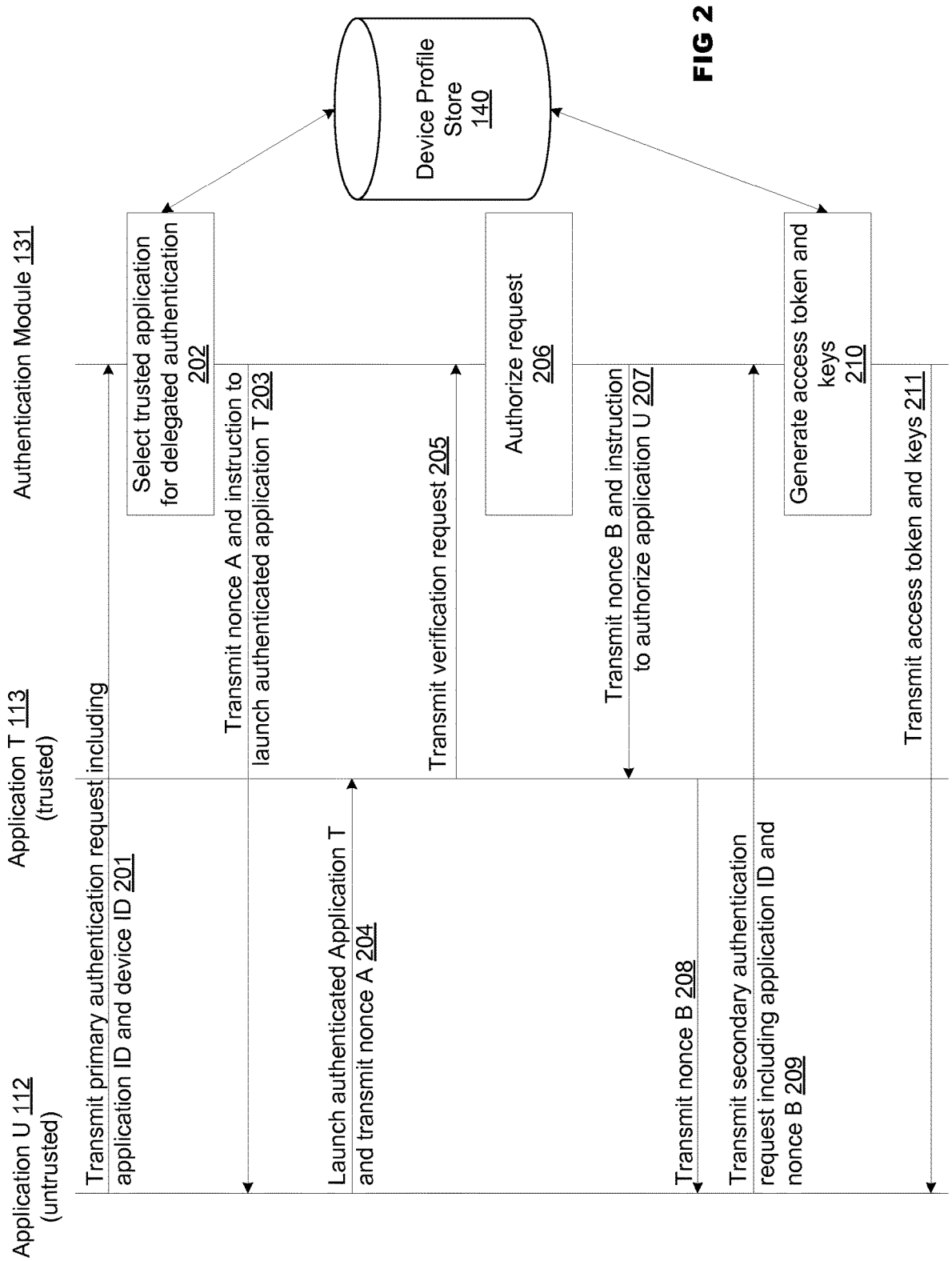
FIG. 2 illustrates an event trace for the delegated authentication of an untrusted application executing on a client device.

FIG. 2 illustrates an event trace for the delegated authentication of application U 112 executing on a client device 110. When application U 112 is initialized, the authentication engine 114 transmits 201 a primary authentication request to the identity server. Application U 112 may be initialized when the application is first installed on the client device 110 or at a later time when the user of the client device 110 launches the application. The primary authentication request transmitted by application U 112 includes a unique parameter of the client device 110 on which the application is executing. The unique parameter is correlated with the credentials associated with the client device 110 such that the unique parameter can uniquely identify the client device 110. The unique parameter may be an identifier of the client device, such as a phone number or a media access control (MAC) address, or a representation of one or more attributes of the client device, such as screen size and resolution, volume settings, or carrier information.

In response to receiving the authentication request, the authentication module 131 selects 202 a trusted application executing on the same client device 110. Specifically, the authentication module 131 accesses the device profile of the client device 110 stored in the device profile store 140. As discussed above, the device profile of the client device 110 specifies a list of trusted applications executing on the client device 110 and a level of activity determined for each of those applications. In one embodiment, the authentication module 131 selects a trusted application that has a higher likelihood of still being present on the client device 110 relative to other applications. The authentication module 131 may determine the likelihood of the application still being present based on the application having a higher or more recent level of activity relative to other applications included in the device profile.

For the purposes of this example discussion, the authentication module 131 selects application T 111 on client device 110 for the delegated authentication of application U 112. Once application T 111 is selected, the authentication module 131 transmits 203 to application U 112 a cryptographic nonce (further described below), e.g., nonce A, and an instruction to continue the authentication process via application T 111. The nonce and the instruction are transmitted to application U 112 via the authentication engine 114.

A cryptographic nonce is an arbitrary (and, often, randomly generated) number that is used to secure communication between one or more entities. The authentication module 131 maintains a history of nonces transmitted to a trusted application during the delegated authentication process of an untrusted application. When transmitting requests to the authentication module 131, the trusted and the untrusted application generate a hash of the application identifier of the untrusted application based on the most recently received nonce. The hashed identifier is included in the request. In one embodiment, authentication engine 114 is configured with a hash function that takes as input the application identifier and the nonce and generates as output a hash of the application identifier using the nonce as the hash key. The trusted and untrusted applications use the hash function provided by the authentication engine 114 to generate the hashed identifier.

The authentication module 131 compares the received hashed identifier against a locally-generated hash of the application identifier. The authentication module 131 generates the locally-generated hash based on the most recently transmitted nonce. In one embodiment, the authentication module 131 is configured with a hash function that takes as input the application identifier of an application and the most recently transmitted nonce and generates as output a hash of the application identifier using the nonce as the hash key. This is the locally-generated hash. If the received hashed identifier matches the locally-generated hash of the application identifier, then the authentication module 131 determines that the received request is valid and not a result of a replay attack. In alternative embodiments, a different identifier, other than the application identifier, may be hashed using the nonce. The different identifier may be an identifier configured into the authentication engine 114 that is also available to the authentication module 131. Optionally, a request from an application may include a value in plaintext and a hashed value generated using the most recently received nonce. In response, the authentication module 131 generates a hash of the plain text value using the most recently transmitted nonce and compares the hashed plain-text value to the hashed value included in the request.

In response to receiving nonce A and the instruction to continue authentication via application T 111, application U 112 transmits an inter-application authentication request to application T 111 via the authentication engine 114. In operation, application U 112 launches 204 application T 111 using an operation provided by the authentication engine 114. Application U 112 also transmits nonce A received from the authentication module 131 to application T 111 via the authentication engine 114.

As discussed above, the authentication engine 114 is an SDK that provides different types of functionality to the applications, such as application U 112 and application T 111, that integrate with the authentication engine 114. One functionality provided by the authentication engine 114 is the ability for an application that integrates with the authentication engine 114 to launch and communicate with other applications within the same computing environment that are also integrated with the authentication engine 114. Application U 112 uses this functionality of the authentication engine 114 to launch application T 111 and transmit nonce A received from the authentication module 131 to application T 111.

Application T 111, in turn, transmits 205 a verification request to the authentication module 131 on behalf of application U 112. Again, application T 111 transmits the verification request using functionality provided by the authentication engine 114 that allows an application that integrates with the authentication engine 114 to bi-directionally communicate with the authentication module 131. The verification request transmitted by application T 111 includes the application identifier associated with application U 112. Optionally, to indicate the source of the verification request, application T 111 hashes the application identifier included in the verification request using nonce A and signs the request using the private key of application T 111.

The authentication module 131 authorizes 206 the verification request upon determining that the verification request is transmitted by a trusted application executing on the client device 110 in a timely manner. To determine whether a request was transmitted by a trusted application, the authentication module 131 decrypts the signed verification request using the public key of application T 111. The public key is included in the application profile of application T 111 stored in the device profile store 140. The authentication module 131 also determines whether the request is timely (for example, is not a replay attack) by comparing the hashed application identifier (hashed using the nonce transmitted to the trusted application) included in the verification request with a locally-generated hash of the application identifier. If the two values match, then the authentication module 131 determines that the request is timely. When the request is received from a trusted source and is timely, the authentication module 131 authorizes the verification request.

Once the verification request is authorized, the authentication module 131 transmits 207 to application T 111 a cryptographic nonce (e.g., nonce B) and an instruction to authorize application U 112 to continue the authentication process. The nonce and the instruction are transmitted to application T 111 via the authentication engine 114. Application T 111 in turn transmits 208 nonce B to application U 112 to continue the authentication process with the authentication module 131.

Application U 112, in response to receiving nonce B, transmits 209 a secondary authentication request including nonce B and the application identifier associated with application U 112 to the authentication module 131. In one embodiment, application U 112 generates a hash of the application identifier using nonce B and transmits the hashed application identifier to the authentication module 131.

The authentication module 131, having already authorized the authentication of application U 112 via application T 111, generates 210 an access token, a public key, and a private key for application U 112. The authentication module 131 transmits 211 the access token and the keys to application U 112, which is now a trusted application. The authentication module 131 also updates the device profile associated with the client device 110 to indicate that application U 112 is a trusted application.

Application U 112 uses the authentication token and the keys for subsequent communications with the identity server 130 and any third party server that requires the application to be authenticated. In one example, application U 112 transmits the authentication token to the application server 150. The application server 150 authorizes application U 112, based on the authentication token, to access to data stored in the application data store 160 that may only be accessed by the credentials associated with the client device 110 on which application U 112 is executing.

In an embodiment, the delegated authentication process described above enables cross-application data sharing as the applications are authenticated using a common identity, i.e., the credentials associated with the device on which the applications are installed. For example, application server 150 may allow access to data stored in application data store 160 to any application that is authenticated using the common identity. As a result, one application may store data in the application data store 160 via the application server 150 and a different application may access that data via the application server 150. Such data includes photos, documents, music, configurations, etc.

In one embodiment, an untrusted application and a trusted application reside on different client devices 110. In such an embodiment, the two applications communicate over a cross-device communication channel, such as over Bluetooth or a wireless network, to proceed with the delegated authentication process. To further secure the authentication process in such an embodiment, the trusted application may request confirmation from a user of the client device on which the trusted application executes before proceeding with the authentication of the untrusted application.

Figure 3:
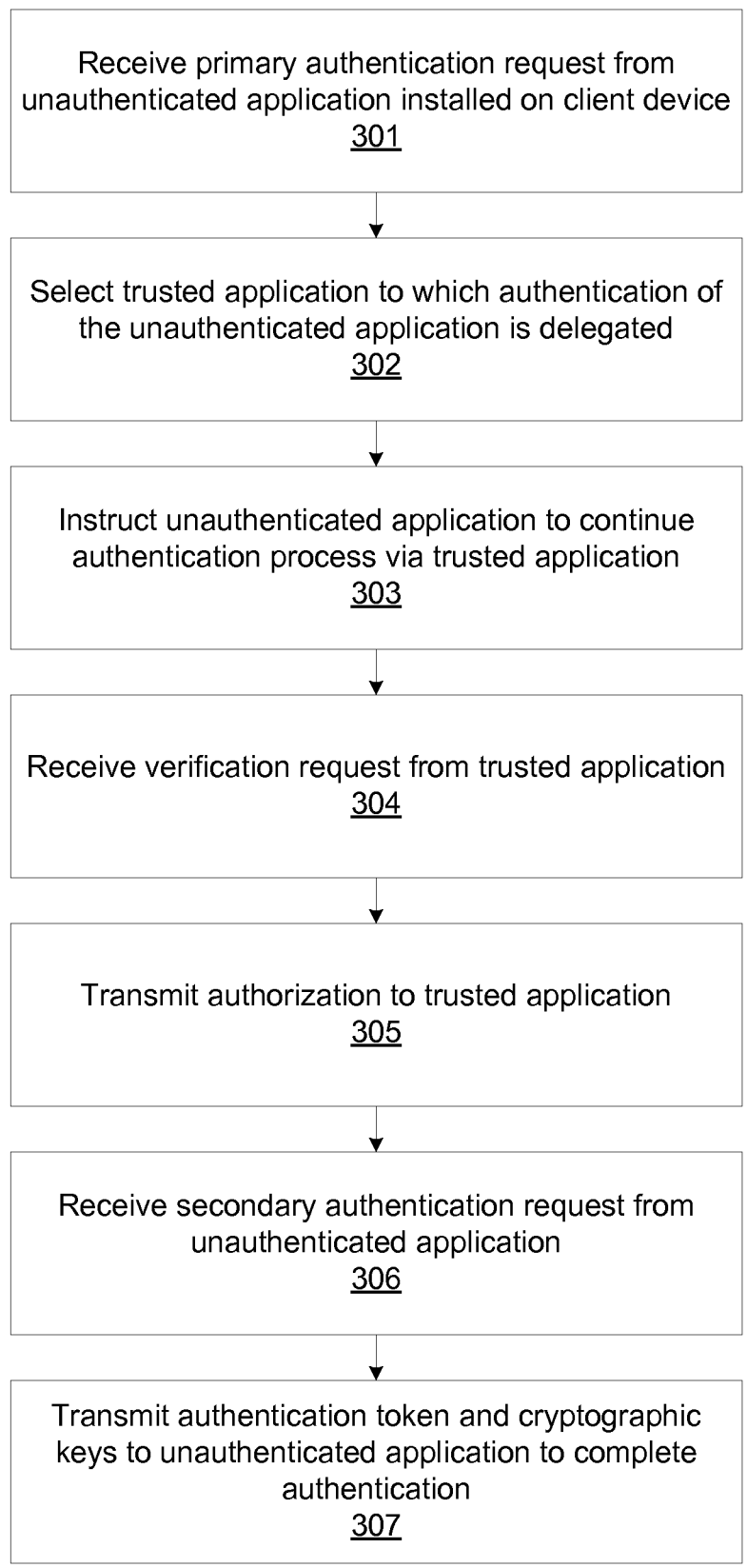
FIG. 3 illustrates an example process diagram for authenticating an application executing on a client device.

FIG. 3 illustrates an example process diagram for authenticating an application, e.g., application U 112, executing on a client device, e.g., client device 110. Other embodiments may perform the steps of the process illustrated in FIG. 3 in different orders and can include different, additional and/or fewer steps. The process may be performed by any suitable entity, such as the authentication module 131.

The authentication module 131 receives 301 a primary authentication request from an untrusted application installed on a given client device 110. The authentication request includes a unique parameter of the client device 110 and an application identifier associated with the application. The unique parameter may be an identifier of the client device, such as a phone number or a media access control (MAC) address, or a representation of two or more attributes of the client device, such as screen size and resolution, volume settings, or carrier information. The combination of two or more attributes may uniquely identify the client device.

In response to receiving the authentication request, the authentication module 131 selects 302 a trusted application, e.g., application T 111, also installed on the same client device 110. Specifically, the authentication module 131 selects a trusted application from a list of trusted applications specified by the device profile of the client device 110. The authentication module 131 instructs 303 the untrusted application to continue the authentication process via the selected trusted application. Specifically, as discussed in conjunction with FIG. 2, the authentication module 131 transmits to the untrusted application a cryptographic nonce, e.g., nonce A, and an instruction to continue the authentication process using the selected trusted application. The nonce and the instruction are transmitted to the untrusted application via the authentication engine 114.

As instructed, the untrusted application, e.g., application U 112, continues the authentication process via the selected trusted application, e.g., application T 111. Specifically, as discussed in conjunction with FIG. 2, the untrusted application launches the trusted application using functionality provided by the authentication engine 114 and transmits the nonce received by the authentication module 131 to the trusted application.

The trusted application proceeds to verify that the untrusted application is requesting authentication on the instruction of the authentication module 131. Accordingly, the authentication module 131 receives 304 a verification request from the trusted application. The verification request indicates to the authentication module 131 that the untrusted application launched the trusted application and requested to continue authentication via the trusted application. The verification request is signed using the trusted application's private key, and the authentication module 131 determines the validity of the verification request by decrypting the request using the trusted application's public key.

When the request is determined to be valid, the authentication module 131 transmits 305 an authorization to the trusted application indicating that the untrusted application may rightfully be authenticated with the credentials associated with the client device 110 on which the application is executing. The trusted application transmits the authorization to the untrusted application. Accordingly, the authentication module 131 receives 306 a secondary authentication from the untrusted application. In response, the authentication module 131 transmits 307 an authentication token and cryptographic keys associated with the application to the untrusted application, thus, completing the authentication process.

Example Machine Architecture

Figure 4:
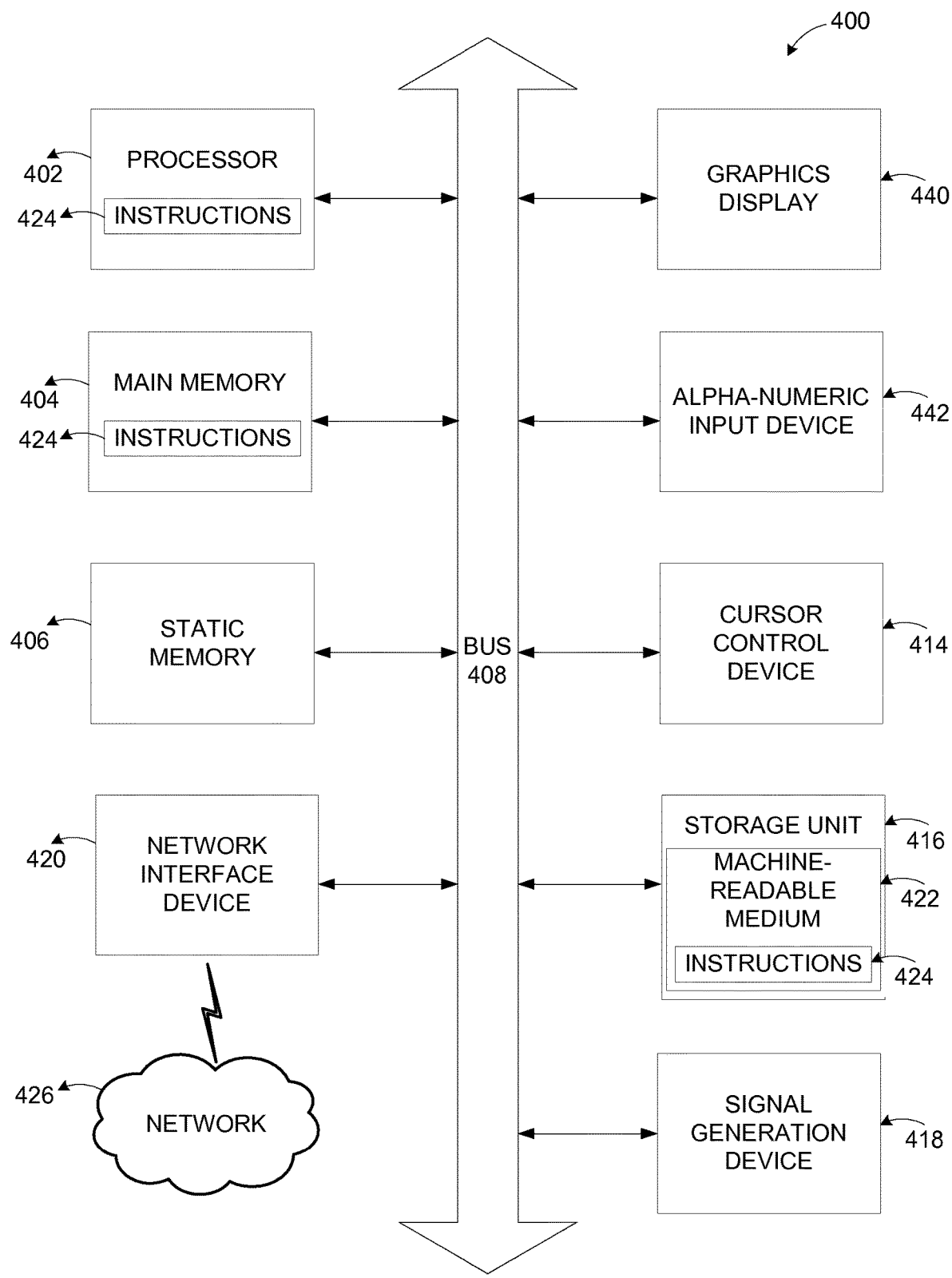
FIG. 4 is a block diagram illustrating components of an example machine able to read instructions from a machine-readable medium and execute them in a processor (or controller).

FIG. 4 is a block diagram illustrating components of an example machine (or device) able to read instructions from a machine-readable medium and execute them in a processor (or controller), such as by a processor of client device 110, identity server 130, or application server 150. Specifically, FIG. 4 shows a diagrammatic representation of a machine in the example form of a computer system 400. The computer system 400 can be used to execute instructions 424 (e.g., program code or software) for causing the machine to perform any one or more of the methodologies (or processes) described herein, for example with respect to FIGS. 1-3. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404 and the storage unit 416 communicate via a bus 408.

In addition, the computer system 406 can include a static memory 406, a display driver 440 (e.g., to drive a plasma display panel (PDP), a liquid crystal display (LCD), or a projector). The computer system 400 may also include alphanumeric input device 442 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 may also reside, completely or at least partially, within the main memory 404 or within the processor 402 (e.g., within a processor's cache memory) during execution thereof by the computer system 400, the main memory 404 and the processor 402 also constituting machine-readable media. The instructions 424 may be transmitted or received over a network 426 via the network interface device 420.

While machine-readable medium 422 is shown in an example embodiment to be a single medium, the term "machine-readable medium" should be taken to include a single medium or multiple media (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The delegated authentication mechanism as disclosed provides benefits and advantages that include enabling any trusted application on a device to authenticate an untrusted application. Thus, the user of the client device is not required to install a particular application for authentication purposes as any trusted application is enabled to play that role. Further, the delegated authentication mechanism allows different applications to share common credentials that, in turn, allows the application to share data that is accessible to the common credentials. Specifically, an application server may allow access to data stored in an application data store to any application that is authenticated using the common credentials. As a result, one application may store data in the application data store via the application server and a different application may access that data via the application server. Such data includes photos, documents, music, configurations, etc.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 and 4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 402, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for delegating authentication of an untrusted application executing on a client device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system comprising:
   one or more computers having one or more processors and one or more computer readable storage media, the one or more computer readable storage media storing instructions that when executed by the one or more processors cause the one or more computers to perform operations comprising:
maintaining one or more device profiles, each device profile corresponding to a respective client device and comprising a device identifier for the client device and at least one application identifier;
receiving a first authentication request from a first application of a first client device, the first authentication request comprising a first application identifier for the first application and a first device identifier for the client device;
determining that the one or more device profiles do not include a device profile comprising the first device identifier; and
in response to determining that the one or more device profiles do not include a device profile comprising the first device identifier:
authenticating the first application, comprising requesting authentication credentials from the first client device, and
adding a new device profile to the one or more device profiles, wherein the device profile comprises the first device identifier and the first application identifier.

2. The system of claim 1, wherein the operations further comprise:
receiving a second authentication request from a second application of the first client device, the second authentication request comprising a second application identifier for the second application and the first device identifier for the first client device;
determining that the one or more device profiles include the device profile comprising the first device identifier; and
in response to determining that the one or more device profiles include the device profile comprising the first device identifier:
authenticating the second application using the first application identified by the first application identifier in the device profile comprising the first device identifier.

3. The system of claim 2, wherein the system further comprises an application data store, and wherein the operations further comprise:
providing, through the first application, one or more items of content to the application data store; and
after authenticating the second application, retrieving, through the second application, the one or more items of content from the application data store.

4. The system of claim 2, wherein authenticating the first application further comprises generating a first access token for the first application, and wherein authenticating the second application comprises:
receiving a verification request from the first application for authenticating the second application; and
transmitting a second access token to the second application, wherein the second access token indicates that the second application is authenticated with the authentication credentials from the client device.

5. The system of claim 2, wherein the operations further comprise updating the device profile comprising the first device identifier with the second application identifier.

6. The system of claim 5, wherein the operations further comprise:
receiving a third authentication request from a third application of the client device, the third authentication request comprising a third application identifier for the third application and the device identifier for the client device;
determining that the one or more device profiles include the device profile comprising the device identifier;
in response to determining that the one or more device profiles include the device profile comprising the device identifier, determining that the device profile comprises the first application identifier and the second application identifier; and
in response to determining that the device profile comprises the first application identifier and the second application identifier:
selecting one of the first application identifier and the second application identifier, and
authenticating the third application based on the third application continuing authentication by an application represented by the selected application identifier.

7. The system of claim 6, wherein selecting one of the first application identifier and the second application identifier comprises selecting an application identifier based on respective application usage histories of the first application and the second application.

8. The system of claim 7, wherein selecting the application identifier based on the respective application usage histories of the first application and the second application comprises selecting the application identifier based on which of the first application and the second application was used most recently by a user of the client device.

9. The system of claim 1, wherein the operations further comprise:
receiving a second authentication request from a second application of a second client device, the second authentication request comprising a second application identifier for the second application and a second device identifier for the client device;
determining that the one or more device profiles include a device profile comprising the second device identifier; and
in response to determining that the one or more device profiles include the device profile comprising the second device identifier, authenticating the second application using the second application identified by the second application identifier in the device profile comprising the second device identifier.

10. The system of claim 1, wherein authenticating the first application further comprises generating an access token and keys for the first application.

11. A method comprising:
maintaining one or more device profiles, each device profile corresponding to a respective client device and comprising a device identifier for the client device and at least one application identifier;
receiving a first authentication request from a first application of a first client device, the first authentication request comprising a first application identifier for the first application and a first device identifier for the client device;
determining that the one or more device profiles do not include a device profile comprising the first device identifier; and
in response to determining that the one or more device profiles do not include a device profile comprising the first device identifier:

authenticating the first application, comprising requesting authentication credentials from the first client device, and
adding a new device profile to the one or more device profiles, wherein the device profile comprises the first device identifier and the first application identifier.

12. The method of claim 11, wherein the method further comprises:
receiving a second authentication request from a second application of the first client device, the second authentication request comprising a second application identifier for the second application and the first device identifier for the first client device;
determining that the one or more device profiles include the device profile comprising the first device identifier; and
in response to determining that the one or more device profiles include the device profile comprising the first device identifier:
authenticating the second application using the first application identified by the first application identifier in the device profile comprising the first device identifier.

13. The method of claim 12, wherein the method further comprises:
providing, through the first application, one or more items of content to an application data store; and
after authenticating the second application, retrieving, through the second application, the one or more items of content from the application data store.

14. The method of claim 12, wherein authenticating the first application further comprises generating a first access token for the first application, and wherein authenticating the second application comprises:
receiving a verification request from the first application for authenticating the second application; and
transmitting a second access token to the second application, wherein the second access token indicates that the second application is authenticated with the authentication credentials from the client device.

15. The method of claim 12, wherein the method further comprises updating the device profile comprising the first device identifier with the second application identifier.

16. The method of claim 15, wherein the method further comprises:
receiving a third authentication request from a third application of the client device, the third authentication request comprising a third application identifier for the third application and the device identifier for the client device;
determining that the one or more device profiles include the device profile comprising the device identifier;
in response to determining that the one or more device profiles include the device profile comprising the device identifier, determining that the device profile comprises the first application identifier and the second application identifier; and
in response to determining that the device profile comprises the first application identifier and the second application identifier:
selecting one of the first application identifier and the second application identifier, and
authenticating the third application based on the third application continuing authentication by an application represented by the selected application identifier.

17. The method of claim 16, wherein selecting one of the first application identifier and the second application identifier comprises selecting an application identifier based on respective application usage histories of the first application and the second application.

18. The method of claim 17, wherein selecting the application identifier based on the respective application usage histories of the first application and the second application comprises selecting the application identifier based on which of the first application and the second application was used most recently by a user of the client device.

19. The method of claim 11, wherein the method further comprises:
receiving a second authentication request from a second application of a second client device, the second authentication request comprising a second application identifier for the second application and a second device identifier for the client device;
determining that the one or more device profiles include a device profile comprising the second device identifier; and
in response to determining that the one or more device profiles include the device profile comprising the second device identifier, authenticating the second application using the second application identified by the second application identifier in the device profile comprising the second device identifier.

20. The method of claim 11, wherein authenticating the first application further comprises generating an access token and keys for the first application.

21. One or more non-transitory computer-readable storage media encoded with instructions that, when executed by one or more computers, cause the one or more computers to perform operations comprising:
maintaining one or more device profiles, each device profile corresponding to a respective client device and comprising a device identifier for the client device and at least one application identifier;
receiving a first authentication request from a first application of a first client device, the first authentication request comprising a first application identifier for the first application and a first device identifier for the client device;
determining that the one or more device profiles do not include a device profile comprising the first device identifier; and
in response to determining that the one or more device profiles do not include a device profile comprising the first device identifier:
authenticating the first application, comprising requesting authentication credentials from the first client device, and
adding a new device profile to the one or more device profiles, wherein the device profile comprises the first device identifier and the first application identifier.

22. The computer-readable storage media of claim 21, wherein the operations further comprise:
receiving a second authentication request from a second application of the first client device, the second authentication request comprising a second application identifier for the second application and the first device identifier for the first client device;
determining that the one or more device profiles include the device profile comprising the first device identifier; and in response to determining that the one or more device profiles include the device profile comprising the first device identifier:
  authenticating the second application using the first application identified by the first application identifier in the device profile comprising the first device identifier.

23. The computer-readable storage media of claim 22, wherein the operations further comprise:
  providing, through the first application, one or more items of content to an application data store; and
  after authenticating the second application, retrieving, through the second application, the one or more items of content from the application data store.

24. The computer-readable storage media of claim 22, wherein authenticating the first application further comprises generating a first access token for the first application, and wherein authenticating the second application comprises:
  receiving a verification request from the first application for authenticating the second application; and
  transmitting a second access token to the second application, wherein the second access token indicates that the second application is authenticated with the authentication credentials from the client device.

25. The computer-readable storage media of claim 22, wherein the operations further comprise updating the device profile comprising the first device identifier with the second application identifier.

26. The computer-readable storage media of claim 25, wherein the operations further comprise:
  receiving a third authentication request from a third application of the client device, the third authentication request comprising a third application identifier for the third application and the device identifier for the client device;
  determining that the one or more device profiles include the device profile comprising the device identifier;
  in response to determining that the one or more device profiles include the device profile comprising the device identifier, determining that the device profile comprises the first application identifier and the second application identifier; and
  in response to determining that the device profile comprises the first application identifier and the second application identifier:
    selecting one of the first application identifier and the second application identifier, and
    authenticating the third application based on the third application continuing authentication by an application represented by the selected application identifier.

27. The computer-readable storage media of claim 26, wherein selecting one of the first application identifier and the second application identifier comprises selecting an application identifier based on respective application usage histories of the first application and the second application.

28. The computer-readable storage media of claim 27, wherein selecting the application identifier based on the respective application usage histories of the first application and the second application comprises selecting the application identifier based on which of the first application and the second application was used most recently by a user of the client device.

29. The computer-readable storage media of claim 21, wherein the operations further comprise:
  receiving a second authentication request from a second application of a second client device, the second authentication request comprising a second application identifier for the second application and a second device identifier for the client device;
  determining that the one or more device profiles include a device profile comprising the second device identifier; and
  in response to determining that the one or more device profiles include the device profile comprising the second device identifier, authenticating the second application using the second application identified by the second application identifier in the device profile comprising the second device identifier.

30. The computer-readable storage media of claim 21, wherein authenticating the first application further comprises generating an access token and keys for the first application.

* * * * *